United States Patent
Waugh

[19]

[11] Patent Number: 6,104,928
[45] Date of Patent: Aug. 15, 2000

[54] DUAL NETWORK INTEGRATION SCHEME

[75] Inventor: Daniel R. Waugh, Friedrichshafen, Germany

[73] Assignee: Nortel Dasa Network System GmbH & Co. KG, Immenstaad, Germany

[21] Appl. No.: 08/946,496

[22] Filed: Oct. 7, 1997

[51] Int. Cl.[7] .................................................. H04Q 7/20
[52] U.S. Cl. ........................................ 455/445; 455/422
[58] Field of Search .................................... 455/445, 422, 455/552, 558, 551

[56] References Cited

U.S. PATENT DOCUMENTS

| | | | |
|---|---|---|---|
| 5,818,824 | 10/1998 | Lu et al. ................................. | 455/552 |
| 5,854,976 | 12/1998 | Garcia Aguilera et al. ............ | 455/558 |
| 5,901,359 | 5/1999 | Malmstrom ............................. | 455/422 |
| 5,953,651 | 9/1999 | Lu et al. ................................. | 455/445 |

FOREIGN PATENT DOCUMENTS

| | | |
|---|---|---|
| 0 602 779 | 6/1994 | European Pat. Off. . |
| 0 779 757 | 6/1997 | European Pat. Off. . |

OTHER PUBLICATIONS

Dettmer, "Where there's WILL", IEEE Review, Jul., 1995, pp. 145–148.

Tuttlebee, "Cordless telephones and cellular radio; synergies of DECT and GSM", Electronics and Communication Engineering Journal, Oct., 1996, pp. 213–223.

*Primary Examiner*—Daniel S. Hunter
*Assistant Examiner*—Myron K. Wyche

*Attorney, Agent, or Firm*—Lee, Mann, Smith, McWilliams, Sweeney & Ohlson

[57] ABSTRACT

The present invention provides geographically fixed receiver functionality for subscriber information which specifies the subscriber's identity in a mobile telecommunications system. This is achieved in accordance with the present invention by associating the Subscriber Identification Information (SII) with a fixed geographical reference point rather than with a particular device. In accordance with one embodiment of the present invention the access point lies outside the radio telecommunications system. In this embodiment, the control signals of the mobile system must be transmitted right up to the subscriber's premises. In a further preferred embodiment the access point lies in the radio telecommunications system. In the latter embodiment, the control signals of the mobile telecommunications system may be terminated in an access node which may be conveniently located in a wired base station. In this embodiment, the control signals of the mobile telecommunications system are not transmitted to the customer premises. Also, the voice coding typically used in mobile telecommunications systems may be terminated at the access node and not at the customer premises. In another embodiment of the invention, the functions of the access node of the previous embodiment is shared between an access base station and a responder on the customer's premises. The responder is capable of responding to certain inquiries initiated in the wireless network, e.g. to provide subscriber identity information or to provide the result of an encryption algorithm carried out on a random number supplied from the wireless network.

66 Claims, 8 Drawing Sheets

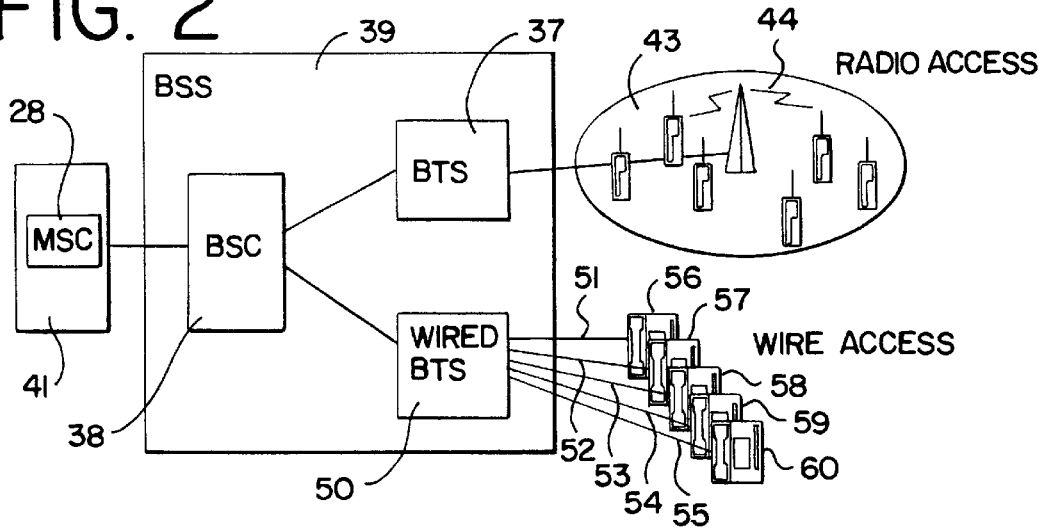
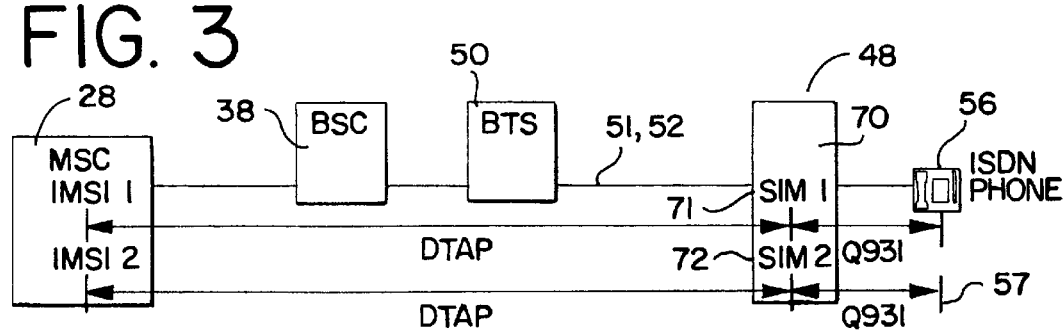
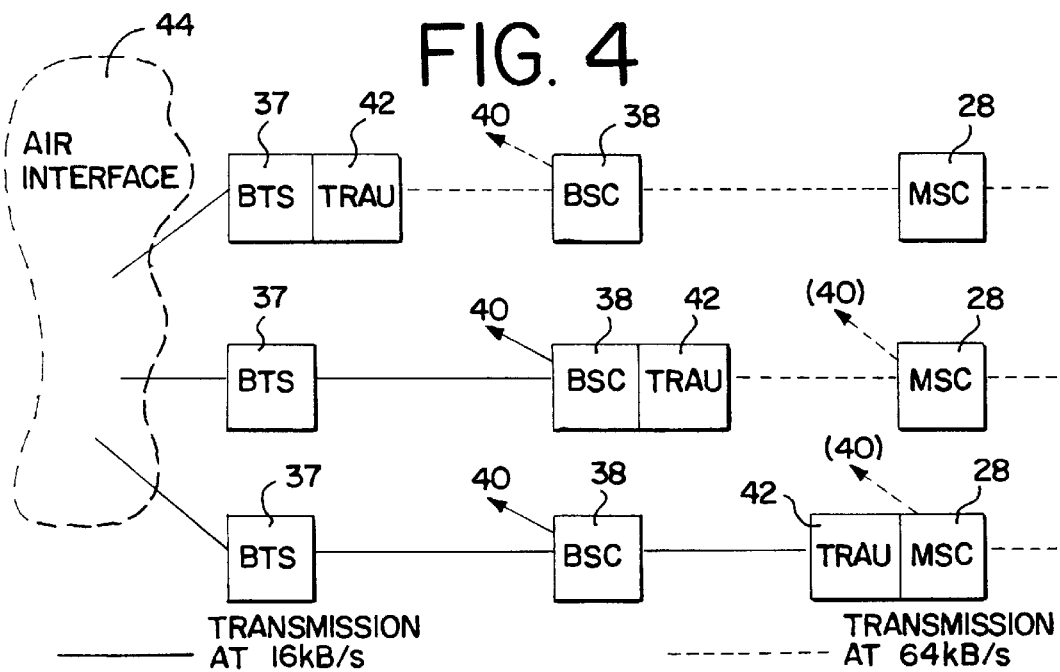

DUAL NETWORK INTEGRATION SCHEME

The present invention relates to the integration of two networks, e.g. a fixed and mobile telecommunications system and in particular to a access node and a responder for use in such an integrated system as well as methods of operating the integrated system, the responder and the access node.

TECHNICAL BACKGROUND

The article "Cordless telephones and cellular radio: synergies of DECT and GSM" by W. H. W. Tuttlebee in Electronics and Communications Engineering Journal, October 1996, pages 213 to 223 discusses the interest among fixed or wireline telecommunications operators to provide some telecommunication services by radio links and the interest among mobile telephone service operators to provide a complete range of services in order to compete with the traditional fixed telecommunication systems. The present invention relates to the integration of fixed and mobile telecommnunication services. Conventionally this integration is limited to the provision of single-number routing regardless of location, i.e. to provide mobility of the subscriber anywhere within a geographical area and independent of the transmission system of messages to the subscriber. Such schemes involve the co-operation of one or more of fixed, cellular radio or cordless telephone networks.

Despite this interest in integration of the various systems two basic philosophies still exist as to how a telecommunications network is to be organized. The older of these two systems switches calls through to a particular location. This type of system is well known as the "Plain Old Telephone System" ("POTS"). In an implementation of land lines the service is generally tied to the access method. Service provisioning, customer service and problem resolution are tailored to the idea that access and service are tied together. The physical management of the large number of subscriber loops served by the network depends upon this mapping. Subscribers are provided with a directory number for a location in the system, i.e. to a connection point and not for a particular receiving device. Modifications to such conventional systems are known, e.g. fixed radio access known from the article by R. Dettmer, in the IEE Review from July, 1995, pages 145 to 148. Such radio access is merely the substitution of one leg of the transmission path of a single telecommunications network with a radio link but is not the integration of two networks.

On the other hand, the more modem mobile telephone telecommunication systems allow call routing to a particular device independent of its location provided it is within the radio coverage area of the system. To be able to locate a receiving device, an electronic means for identifying the device and thereby indirectly the subscriber, is provided in the receiving device. This identification may be in the form of information stored in a memory which is part of the mobile receiving device itself or it may be in a separate insertable memory module, for instance a Subscriber Identity Module (SIM) in an integrated chip card as is known from the European GSM mobile telecommunication system. The radio telecommunication system protocols are used to identify a user from the SIM's encoded information, and the services to which the user has subscribed can be derived from the same stored information.

The issue of mobility is traditionally considered to be of very great importance. For instance two major research projects, the Future Public Land Mobile Telecommunication System (FPLMTS) of the CCIR Committee TG 8/1 and the Universal Mobile Telecommunications System (UMTS), which is part of the European RACE program, have the common goals of providing international roaming by mobile users, of providing service quality equivalent to fixed-line telecommunication systems and of providing some ISDN services.

Certain types of data transmission, e.g. fax, may pose technical problems with mobile phones. Modem generated tones have gaps and strong phase changes due to rapid multipath fading. This results in data being garbled or lost. Further, handoffs between cells of the mobile telecommunications system are an even stronger cause of data loss. This problem cannot be completely solved by using a stationary receiving device. In large cities such as Paris, France, handoffs can be expected within the normal duration of a fax message even if the faxing device is stationary. These handoffs are forced because of changes in the signal intensity caused by such variables as moving traffic, swinging cranes on building sites and the need to readjust the boundaries of cells in order to cope with load changes and the limitations of the frequency spectrum available. Further, the bandwidth of a mobile telephone system is usually very limited whereas wireline connections may carry 100 kb/s or higher. Hence, for some types of traffic a mobile phone subscriber may prefer an alternative type of connection.

A subscriber may wish to have all e-mail messages or faxes sent and received by a device which is not subjected to handovers and/or has a higher transmission rate. This could be achieved by automatically directing a call to a fixed telephone in a conventional (POTS) wireline telephone system. This approach has the disadvantage that the subscriber must subscribe to both the wireline and the wireless system. The subscriber may wish to make use of reductions in charges resulting from using one system for all services, rather than have to subscribe to two systems. One possible way of solving this problem would be for the radio telecommunications system provider to put in a wireline system as well as the radio telecommunications system and thus be able to offer both types of service, i.e. mobile telephones and fixed transceivers such as fax machines. This has the disadvantage that the provider must install and maintain two differing sets of equipment.

To achieve an integration of a wireless and a wireline system it is preferred if: a. the subscriber loops (belonging to the wireline system) can be tracked to the subscribers service for problem resolution, routine maintenance, and any possible regulatory requirements; b. the subscriber's SIM information is available to the wireless network transparently, as anything less would require changes to the wireless network traffic model.

SUMMARY OF THE INVENTION

The present invention provides a telecommunications system comprising:
- a first radio telecommunications network having at least one radio coverage area in communication with mobile units and a switching controller for generating and transmitting control signals of a first format; and
- a second telecommunications network including at least one subscriber terminal; said system further comprising:
  - means for storing identifiers of a group of a plurality of subscribers to said first radio telecommunications network, each said subscriber identifier being associated with one subscriber of said group and also being associated with a fixed geographical access point of a plurality of fixed geographical access points, said storing means is adapted to provide said first radio telecommunications network with at least verification information relating to a subscriber of said group; and access node means, said first radio telecommunications network being adapted so that when a call is placed to a subscriber in said group, said switching controller directs the call to said access node means and said access node means terminates control signals of said first format from said switching controller and transfers said call to the subscriber terminal in said second telecommunications network associated with said called subscriber via the fixed geographical access point.

The present invention also provides an access node for use with a radio telecommunications network, comprising:

communication means for receiving signals from, and transmitting signals to the radio telecommunications network in a first format;

means for storing identifiers of a group of a plurality of subscribers to said radio telecommunications network, each said subscriber identifier being associated with one subscriber of said group and also being associated with one of a plurality of output ports of said access node, said storing means being adapted to provide said radio telecommunications network with at least verification information relating to a subscriber of said group of subscribers; and said access node being adapted so that when a call is placed to a subscriber in said group via said radio telecommunications network, said access node terminates control signals of said first format from said radio telecommunications network and transfers said call to the output port associated with said called subscriber.

The present invention also provides a responder suitable for use in a network-wise geographically fixed position in a first telecommunications network, comprising:

means for storing at least one subscriber identity information of a subscriber to a second radio telecommunications network and a key;

verification information means for generating a result of an encryption algorithm with the aid of said key; and means for transmitting said result towards said second radio telecommunications network via said first telecommunications network.

The present invention also provides a method of operating a telecommunications system including a first radio telecommunications network having at least one radio coverage area and a second telecommunications network including subscriber terminals, said method comprising the steps of:

storing identifiers of a group of a plurality of subscribers to said first radio telecommunications network, each said subscriber identifier being associated with one subscriber of said group and also being associated with a fixed geographical access point of a plurality of fixed geographical access points;

providing said first radio telecommunications system with at least verification information relating to a subscriber of said group based on said stored subscriber identifier information when a request therefor is sent from said first radio telecommunications system; and when a call is placed to a subscriber in said group:

said first radio telecommunications network generates control signals of a first format and transmits said control signals and said call to an access node means; and said access node means terminates said control signals of said first format and transfers said call towards said subscriber terminal in said second telecommunications network via the fixed geographical access point associated with said called subscriber.

The present invention also provides a method of operating an access node for use with a radio telecommunications network, comprising:

storing identifiers of a group of a plurality of subscribers to said radio telecommunications network, each said subscriber identifier being associated with one subscriber of said group and also being associated with one of a plurality of output ports of said access node;

providing said radio telecommunications network with at least verification information relating to a subscriber of said group of subscribers on request; and when a call is placed to a subscriber in said group:

receiving control signals of a first format and said call from said radio telecommunications network, and terminating said control signals of said first format and transferring said call to the output port associated with said called subscriber.

The present invention also provides a method of operating a responder in a network-wise geographically fixed position in a first telecommunications network, comprising: storing in said responder at least one subscriber identity information of a subscriber to a second radio telecommunications network and a key; generating a result of an encryption algorithm with the aid of said key; and transmitting said result towards said second radio telecommunication network via said first telecommunications network.

The present invention deviates radically from conventional systems in that it provides geographically fixed receiver functionality for the subscriber information which specifies the subscriber's identity in a mobile telecommunications system. This is achieved in accordance with the present invention by associating the Subscriber Identification Information (SII) with a fixed geographical reference point rather than with a particular device. In accordance with embodiments of the present invention the access point lies outside the radio telecommunications system. In one embodiment, the control signals of the mobile telephone system are transmitted right up to the subscriber's premises. Alternatively, the control signals of the mobile telecommunications system may be terminated in an access node which may be conveniently located in a wired base station. In this embodiment, the control signals of the mobile telecommunications system such as the DTAP signals, are not transmitted to the customer premises. Also, the voice coding typically used in mobile telecommunications systems is terminated at the access node and not at the customer premises. In another embodiment of the invention the functions of the access node described above may be shared between an access base station and responders on the customer's premises. The responder is capable of responding to certain inquiries initiated in the wireless network, e.g. to provide subscriber identity information or to provide the result of an encryption algorithm carried out on a random number supplied from said wireless network.

The present invention allows integration of a radio telecommunications network with another telecommunications network, particularly a wireline network. This may provide the advantage of improved subscriber services, in particular to allow a wireless system operator to provide greater bandwidth and additional services in an economical way without duplicating networks.

The dependent claims define further embodiments of the present invention. The present invention, its embodiments and advantages will now be described with reference to the following drawings.

BRIEF DESCRIPTION OF THE DRAWINGS

FIG. 2 is a schematic representation of a second embodiment of the present invention.

FIG. 3 is a detailed schematic representation of the second embodiment of the present invention.

FIG. 4 shows various possible arrangements of a TRAU in GSM systems and in accordance with the present invention.

DETAILED DESCRIPTION OF THE ILLUSTRATIVE EMBODIMENTS

The present invention will be described with reference to certain embodiments and with reference to certain schematic drawings but the invention is not limited thereto but only by the drawings. The present invention will be described with reference to a system similar to the European GSM system as described in the related technical specifications but the invention is not limited thereto.

A first embodiment of a network in accordance with the present invention will be described with reference to FIGS. 1 to 3. As shown schematically in FIG. 1, generally a wireline network 10 is connected to a wireless network 20. The wireless network 20 as shown is of the switched node type but the present invention is not limited thereto. For instance the wireless network 20 could be implemented as an intelligent network. In the following it will be assumed that the wireless network 20 is a GSM type system but the invention is not limited thereto. The GSM network 20 may cover several countries and may be divided into national GSM networks (PLMN) service areas. There may also be several GSM networks within one country operated by different providers and their respective coverage areas may overlap.

Figure 1:
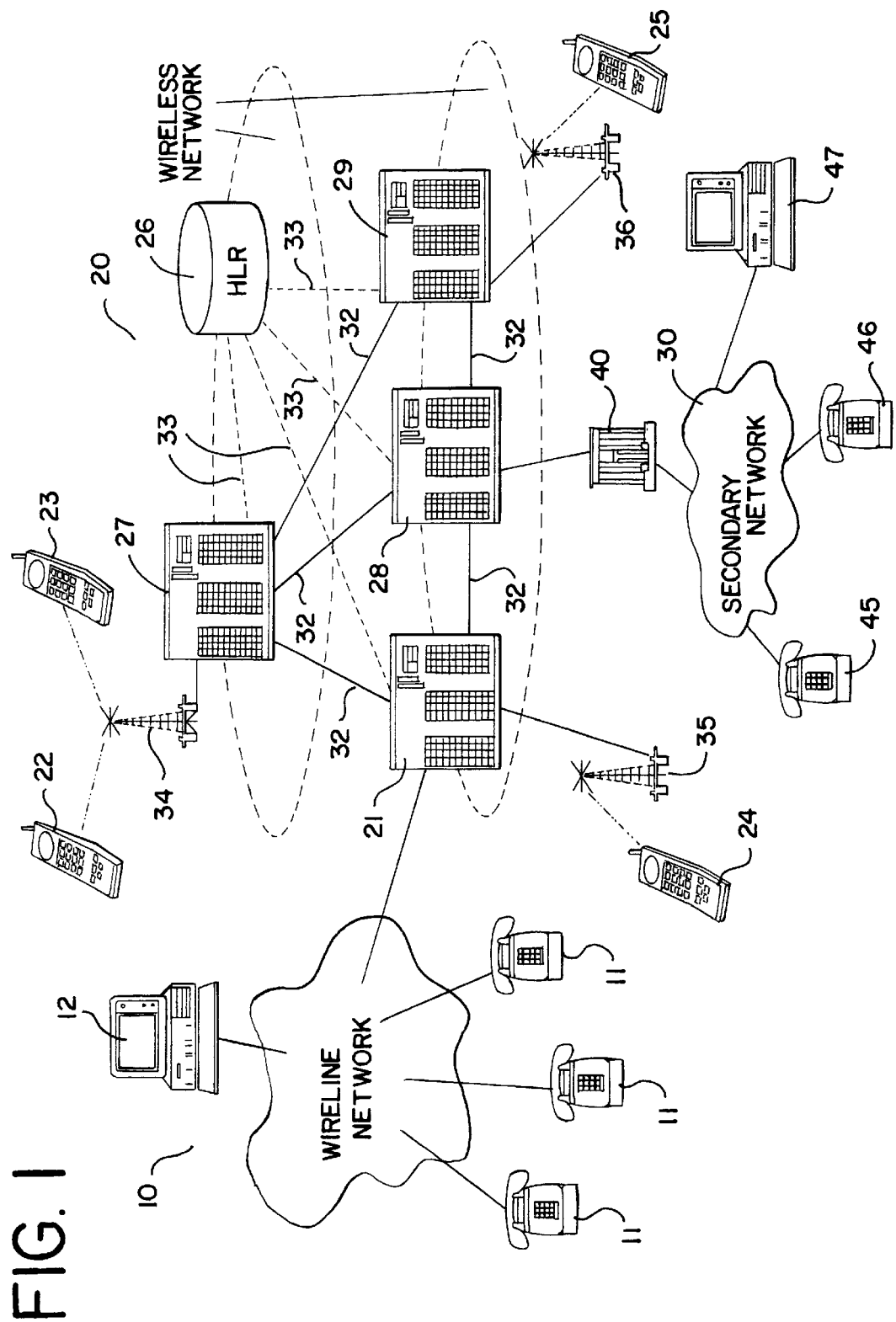
FIG. 1 is a schematic representation of an integrated network in accordance with a first embodiment of the present invention.

As shown in FIG. 1 the conventional wireline network 10 has conventional terminating devices such as telephones 11 or fax machines or a permanently responding terminal 12. The terminal 12 may be answering machine or a voice mail box or a personal computer (PC) configured to receive and store fax and other data transmissions as well as voice messages. The wireless GSM network 20 may include one or more regions each associated with a mobile services switching center (MSC) 21, 27–29. The connection between the wireline network 10 and the wireless network 20 is via a particular type of MSC known as a gateway mobile services switch center (GMSC) 21. The GMSC 21 is connected to a Home Location Register (HLR) 26 and the other MSC's 27–29. The HLR 26 is a database which stores subscriber data, such as location data and Subscriber Identification Information (SII). Each MSC 21, 27–29 serves an area which may include one or more radio coverage areas associated with radio transceivers or base stations (BTS) 34–36. Each MSC 21, 27–29 may service several BTS's 34–36. The smallest location area of the network 20 is called a cell. Associated with each MSC is a visitor location register (VLR, not shown) which is a database which stores information of the location of mobile transceivers 22–25 visiting the area controlled by the respective MSC 21, 27–29. The HLR 26 in turn stores information with respect to which VLR/MSC 21, 27–29 a particular mobile transceiver 22–25 is visiting which is used for routing purposes.

A call from the wireline network 10 is received at the GMSC 21, alternatively, a call from one of the mobile transceivers 22–25 is received at the respective MSC, 21, 27–29. In both cases, the HLR 26 is interrogated as to routing. The call is then completed with one of the mobile phones 22–25. If the mobile phone 22, 23; 24; 25 is in its home area, the call is routed through the respective home MSC 27; 28; 29. If the mobile phone 22–25 is roaming, the respective MSC 27; 28; 29 responsible for radio coverage area in which the mobile device is located, acts as the visited MSC or VMSC. Communications between the GMSC 21 and the other MSC's 27–92 are carried out by lines 32. Communications between the HLR 26, the GMSC 21 and the MSC's 27–29 are carried out via lines 33 in the conventional way. The MSC's 21, 27–29 may be connected to base stations (BTS) 34–36 via intermediate base station controllers (BSC, not shown).

Within the GSM network 20, the subscriber identification information (SII) includes the International Mobile Subscriber Identity IMSI which comprises a GSM mobile country code MCC (three digits), a mobile network code MNC (two digits) and a mobile station identification number MSIN (ten digits). The MSIN is unique within a certain national GSM network and can be specified by the network provider. The SII is stored in a subscriber information storing means or SISM within such mobile phone. In the GSM system the SISM is a separate Subscriber Identity Module (SIM) in each mobile transceiver or mobile station MS 22–25. A SIM is a module separate from any memory or processor used for establishing communication between a mobile station and the network 20. Preferably the means for storing the SII is detachable or removable, e.g. in the form of a SIM integrated circuit card or SIM-ICC. The SIM-ICC is used in the GSM for at least three important functions:

verification and/or authentication of the subscriber to prevent access of unregistered users, radio path ciphering, in particular ciphering of all subscriber information to prevent third-party tapping, to this end the SIM-ICC contains keys to be used in ciphering operations;

subscriber identity protection, to prevent subscriber location by third parties (e.g. to identify that a subscriber is far from home). To achieve these functions the SIM-ICC securely stores not only the IMSI but also stores a private encryption key Ki which is personal to the subscriber. A SIM-ICC is not only a memory store but also includes a processor capable of securely carrying out encryption and decryption without the details of these procedures being detectable. Several different algorithms are used in the GSM system to encrypt and decrypt various types of information, e.g. an algorithm A3 is used to generate a signed result SRES from a randomly generated number RAND, an algorithm A8 is used to generate a future (or "dormant") session key Kc from the randomly generated number RAND and an algorithm A5 is used to cipher and decipher messages using the session key Kc and an exclusive-or operation. Kc is also stored in the MSC 28 and the private Ki as well as the IMSI of each subscriber is stored in an authentication center AuC in the wireless system 20. Usually the AuC is in, or is closely associated with the HLR 26.

In accordance with the present invention verification means confirming that a communication with a particular subscriber terminal has been made. For example, this includes verification that a subscriber may use the facilities of the radio telecommunications network or confirmation that the terminal contacted is the right one. Further, verification is required in a mobile telephone system on a call-by-call basis for billing purposes.

Authentication means in accordance with the present invention means that information is provided from which a check can be made that a specific subscriber's identity has been registered in the radio telecommunications network. Authentication is linked to the subscriber's identity as defined by the subscriber identity information and is required by the radio telecommunications network as this information relates to the confirmation that the particular subscriber may access certain services provided by the radio telecommunications network and associated only with that subscriber. Hence, more information may be required for authentication than for verification. For instance, the authentication information may include which services the subscriber may use.

Preferably, the means for storing the SII (the SISM) in a mobile station is protected against unauthorized direct entry (this includes the subscriber). Integrated circuit SIM cards are designed to be very difficult to duplicate (except by the issuer who is usually a network provider or operator). Further details of the GSM system may be found, for instance, in the book by Michel Mouly and Marie-Bernadette Pautet, "The GSM system for Mobile Communications", Cell & Sys, 1992.

In accordance with the present invention, the wireless network 20 also includes access node means 48 for associating the Subscriber Identification Information (SII) with a fixed geographical reference point. As shown in FIG. 1, embodiments of the present invention may include an access base station (ABS) 40, operatively connected on one side to one of the MSC's (28) and on the other side to a secondary network 30 which may be a further wireline network but the present invention is not limited thereto. The ABS 40 does not need to have a radio coverage area and can be connected via the secondary network 30 to one or more fixed terminal devices 45–47. Wireless telephone networks generally have no method of linking a subscriber to a particular access point. In a pure wireless environment the network access is a pooled resource that is used in a first-come-first-served manner. The access node means 48 in accordance with the present invention provides fixed geographical access points to the wireless network for the terminal devices 45–47 and the relevant group of subscribers. The devices 45–47 are effectively part of a virtual cell which is not part of a radio coverage area of the mobile network 20. The access node 48 may be provided by a separate converter 70, the ABS 40 or by the ABS 40 in combination with other devices such as a responder 77 as will be described later. In accordance with the present application a fixed geographical access point does not include within its meaning simply restraining a mobile station, e.g. by tethering it to a power socket during charging of its internal battery but relates to a network-wise fixed point, i.e. a fixed point, to which calls can be switched. Merely tethering or fixing an MS to a wall does not deprive the MS of its network-wise mobility capability even if it is restrained physically from moving. On the other hand, the subscriber identity information (SII) handled by the access node does not provide mobility in the GSM network 20. For instance, in accordance with an embodiment of the present information any SII associated with an access node may be restricted to the virtual cell associated with the access node. Any attempt to extract the SII and use it in a mobile station will fail, as the first attempt at location updating in the mobile system 20 will result in interrogation of the HLR 26 and access will be denied as the mobile station will not be in the virtual cell associated with the home access node.

FIG. 2 shows schematically a second embodiment of the present invention. As shown, the secondary network 30 is a wireline network and the access base station 40 is provide by a wired base transceiver station (WBTS) 50. The access node in accordance with this embodiment is provided by a converter 70. Other details of the network are as described with respect to FIG. 1. One or more WBTS 50 and one or more conventional base transceiver stations (BTS) 37 may be included in a Base Station Subsystem 39 (BSS). The conventional BTS 37 controls a radio access coverage area 43 and is adapted to receive and transmit messages via radio channels to the mobile stations 22–25. The WBTS 50 and BTS 37 may be connected to a base station controller BSC 38 which, in turn, is connected to the MSC 28 as part of the network and switching sub-system (NSS) 41of a GSM network. Terminal devices 56–60 are connected by wire lines 51 to 55 to the WBTS 50. In accordance with the second embodiment of the present invention, the wire lines 51–55 not only carry the user messages or "traffic" but also carry signals necessary for controlling calls. Wire lines 51–55 may be leased lines from a local public telephone utility. As the WBTS 50 is part of the wireless network 20, the signaling protocols used are those of the wireless network 20 e.g. the DTAP signals between the MSC 28 and a mobile device 22–25. As shown in FIG. 3 schematically, a conversion device 70 is provided on the subscriber's premises and therefore provides geographically fixed access points to the radio telecommunications network 20. Converter 70 contains at least one and usually two subscriber information storing means (SISM) 71, 72 which may be detachable and are preferably protected against direct entry, e.g. some kind of SIM, particularly SIM-ICC's with the associated ICC readers. When the terminal devices 56–60 are ISDN telephones, normally two independent telephone line connections (i.e., two directory numbers) are provided for one ISDN connection to a subscriber's premises. In accordance with the present invention SII's are stored in the converter 70 for use with the mobile network 20 rather than directory numbers, hence, the need for two SISM's 71, 72. The SISM's 71, 72 are necessary so that the terminal devices 56 to 60 on the wireline part of the system appear to the wireless system 20 like any other mobile telephone used on the wireless system 20. The SISM's 71, 72 contain the subscriber identity information which is also stored in the HLR 26 along with the relevant routing information. The converter device 70 terminates the wireless system control signals, e.g. DTAP signals which are normally transmitted between a mobile station and an MSC, and forwards the user messages or "traffic" to the terminal device 56 or 57 as well as any control signals required for call processing in the format of the terminal devices, e.g. in that of a conventional ISDN telephone wireline system if the terminal devices 56, 57 are standard basic rate interface (BRI) ISDN telephones. All services are terminated at the converter 70. The control signals and the user messages from the MSC 28 are passed through the BSC 38 and the WBTS 50 transparently. In effect the converter 70 emulates all the functions of a mobile transceiving device while using a wired interface for transmission and reception instead of a radio interface. Once the converter 70 is in service, the operation is indistinguishable from a normal radio interface. For instance, if the wireless system 20 is a GSM system and the subscriber's terminal equipment 56, 57 uses ISDN signaling, the subscriber is sold or rented a converter 70 that, for instance, contains two SIM-ICC's 71, 72. All service and service inquiries with the SIM-ICC's 71, 72 can be handled locally by the converter 70. The converter 70 terminates all mobile network signaling, e.g. DTAP signaling from the MSC 28, and converts it to ISDN Q931 signaling for the subscriber's terminal equipment 56, 57. Outgoing control signals from the subscriber's terminal equipment 56, 57 are converted to DTAP signals and provided with identification information using data stored on one of the SIM-ICC's 71, 72. The WBTS 50 does not, as a rule, query the SIM-ICC's 71, 72.

The exact functions to be performed by the converter 70 depend upon the compression and coding techniques used for the air interface 44 of the radio telecommunications system 20. Generally, every effort is made to reduce bit rate on the air interface 44 by compression of signals. This is particularly true of voice signals which take up a lot of band width if not compressed. Telephone calls from an MS 22–25 enter the system at the BTS 37 in a compressed or coded form. At some point these signals must be rate adapted to landline bit rates and, if necessary decoded. This is done usually in a Transcoder and Rate Adapting Unit (TRAU) which may be placed in the BTS 37, the BSC 38 or closer to the MSC 28. These three possibilities are shown schematically in FIG. 4. In the GSM system the signals enter or leave the TRAU 42 on the mobile station side at 16 kB/s and the voice signals are vocoded and leave or enter the TRAU 42 respectively on the MSC 28 side at 64 kB/s and the voice signals are uncoded. Vocoding is any method of compressing voice signals and one definition may be the analysis and synthesis of voice, which uses either a vocal track model or quantizes subbands of a speech waveform to remove redundant speech information thereby enabling transmission of the required voice information in a reduced bandwidth. In older designs, the TRAU 42 was placed in the BTS 37 (first alternative in FIG. 4). With these systems the access 48 in accordance with the present invention receives uncoded voice signals and data signals at 64 kB/s from the MSC 28 (indicated by the dotted line arrow leaving BSC 38 towards ABS 40 in the upper alternative of FIG. 4). These can be converted easily into ISDN standard signals in the converter 70. However, in accordance with the present invention the ABS 40 may include, even if the TRAU 42 is normally in the BTS 37, a TRAU 42 in order to exactly emulate the rest of the wireless network 20. In this case, the converter 70 also has to include a TRAU 42 in order to carry out the vodecoding and rate adaption to the system of the terminal devices 56–60, e.g. 64 kB/s of the ISDN. This duplication of TRAU processors is technically unnecessary but may provide the advantage that messages are transmitted on the wire lines 51–55 in compressed form, e.g. 16 kB/s, and that if these lines 51–55 are leased ISDN lines, the transfer of the messages is cheaper.

In alternative ( and more common) sy stems the TRAU 42 may be placed in the BSC 38 or be associated more closely with the MSC 28 (second and third alternatives in FIG. 4). If the access node 48 in accordance with the present invention is connected to a standard BSC 38 in such a GSM system, it receives vocoded speech and signals at 16 kB/s (indicated by the line arrows leaving BSC 38 towards ABS 40 in the lower two alternatives of FIG. 4). In accordance with a modification of the second embodiment of the present invention these compressed signals are passed to the converter 70 which includes a TRAU for vodecoding and rate adaption of messages so that they are adapted to the system us ed by the terminal devices 56–60, e.g. 64 kB/s of ISDN. Placing the TRAU 42 closer to the MSC 28 in the GSM system reduces the cost of leased lines as compressed signals are transmitted along the leased lines, therefore requiring less capacity.

In a further embodiment of the present invention the access 48 may be connected to an MSC 28 (shown by the arrows on the right hand side of FIG. 4 which indicate a connection at 64 kB/s directly to ABS 40) or through a special BSC 38 in such a way that 64 kB/s uncoded signals are received by the converter 70, i.e. by bypassing the conventional TRAU 42. This avoids the vodecoding step in the converter 70, but introduces a non-standard connection to the MSC 28 and may increase the cost of transmitting messages along the leased lines between MSC 28 and the converter 70.

If the secondary network 30 includes some form of radio communication or if there is a possibility that lines 51–55 are unsafe, e.g. unsafe leased lines, it is preferred if the SISM's, e.g. SIM-ICC's, in converter 70 also include ciphering keys and the converter 70 is capable of ciphering messages involving subscriber identity information transmitted from the SISM and for deciphering messages from the MSC 28 involving such data. Such a capability may be provided by a SIM-ICC. If no radio communication is required in the secondary network, e.g. it is a wireline network, ciphering is not preferred in accordance with the present invention.

Figure 5:
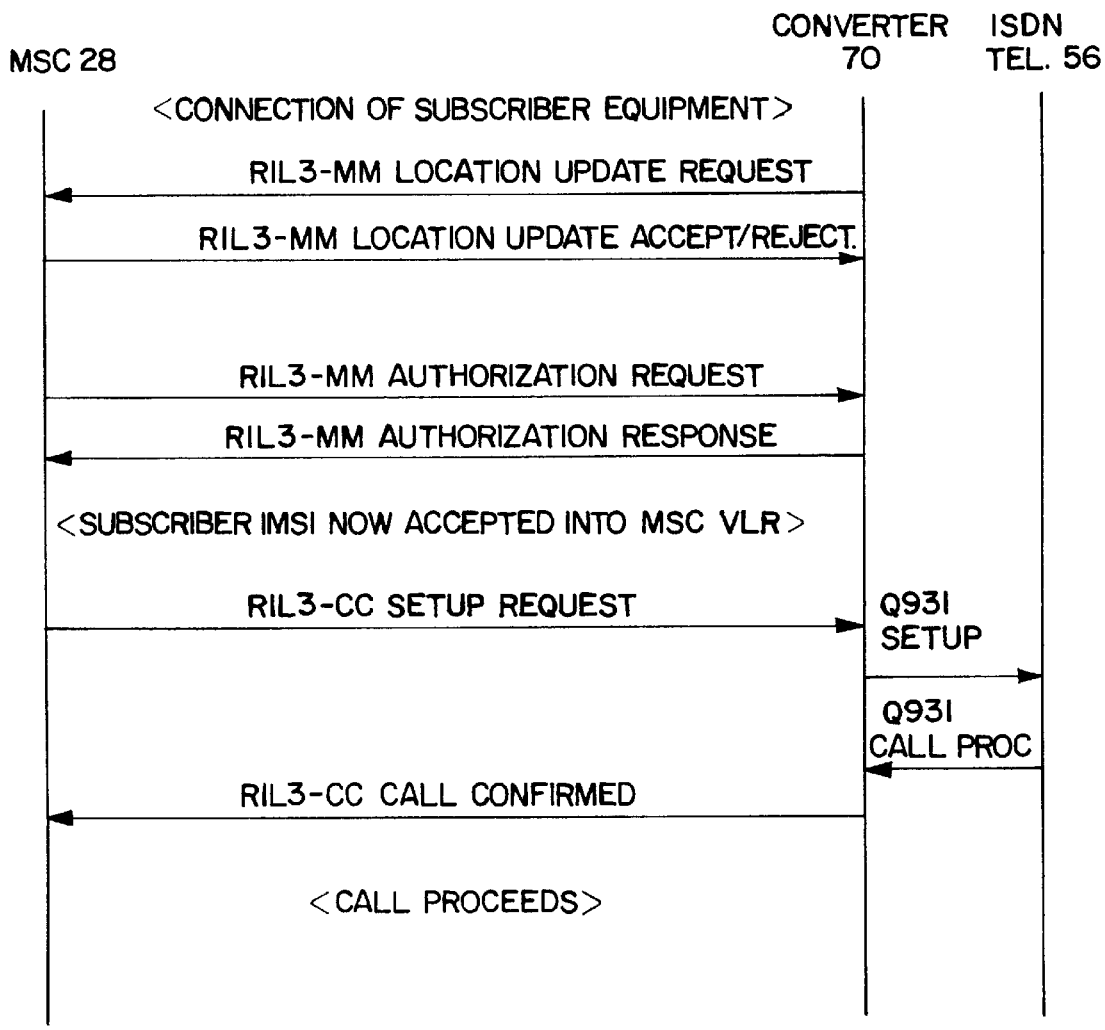
FIG. 5 shows a message sequence in accordance with the second embodiment of the present invention.

One possible message sequence for setting up a call in accordance with the present invention is shown schematically in FIG. 5. In setting up a communication between the wireless network 20 and the terminal devices 56, 57, the HLR 26 and the home MSC 28 need to be informed of the existence of the active SISM's 71, 72 which may be SIM-ICC's. Once the converter 70 with the SIM-ICC's 71, 72 has been installed, the operation of the complete system is relatively simple. In order to register with wireless network 20, the converter 70 sends a request for a location update. In the USM system, this message is called a Location Update Request (LUR) and is part of the RIL3-MM protocol. The LUR contains enough information to identify the subscriber. For instance, the LUR may contain the IMSI mentioned above. Alternatively, the request may contain a Temporary Mobile Subscriber Identity TMSI as i s known from the GSM system. The MSC 28 may respond immediately to the converter 70 or may interrogate the HLR 26. From the LUR, the MSC 38 can derive the system address of the HLR 26

(e.g. from look-up tables) and can relay the request thereto. The answer provided may be either a Location Updating Reject message or, more likely, a Location Update Accept message. The messages between the MSC 28 and the HLR 26 are part of the MAP/D protocols and are not discussed here in detail. It should be noted that location updating may still be required even though there is only one possible "location" for the SIM-ICC's 71 and 72, as it may be necessary to restore the databases in the VLR or the MSC 28 after failures.

Before or after sending an LUR accept message, MSC 28 may request authentication from the converter 70. It is preferred if authentication is of the active type with an exchange between the converter 70 and the MSC 28 of a random number and of the transform of this number by an encryption function using a secret key personal to the subscriber. To do this the MSC sends an Authorization Request which is also part of the GSM RIL3-MM protocol. The Authorization Request contains a randomly generated number RAND which is to be processed by the converter 70. Converter 70 requests one of SIM-ICC's 71, 72 to generate a response, the SRES, from the RAND preferably using an algorithm such as A3 which is a one-way or trap-door function. Such a function allows easy calculation of SRES from Ki and RAND whereas the computation of Ki knowing RAND and SRES should be as complex as possible. In accordance with the present invention ciphering and deciphering of telephone calls is not considered to be necessary, so that the session key Kc is only generated as an option. Converter 70 responds to MSC 28 with the SRES. Hence, converter 70 is a responder in accordance with the present invention. The MSC 28 compares the SRES from converter 70 and the SRES generated by the wireless network 20 (e.g. in the AuC) from the same RAND and same Ki for the subscriber involved. If both agree, converter 70 is now registered in wireless network 20 as if it were a mobile station. Converter 70 may also transmit additional information to the wireless network 20 for authentication of the subscriber, e.g. a list of services. Alternative methods are included in accordance with the present invention, e.g. different keys may be used by the converter 70 and the HLR 70.

A call to one of the terminal devices 56, 57 is completed in the following way. Terminal devices 56, 57 have numbers assigned for the wireless network 20. A call to these devices 56, 57 will therefore either be generated within wireless network 20 or will be directed to wireless network 20 through a GMSC such as 21. For each subscriber information stored in SISM's, e.g. SIM-ICC's, 71, 72 in the converter 70, the routing information to the respective MSC 28 is stored in the HLR 26. As far as the wireless network 20 is concerned, it sees the SISM's 71, 72 in converter 70 just as if they were SIM-ICC's in conventional mobile stations. Any call to one of the terminal devices 56, 57 is routed by the HLR 26 to the MSC 28, and via the BSC 38 and the ABS 40 as, for instance, exemplified by the WBTS 50 and so to the converter 70. The converter 70 receives the call either as 16 kB/s coded signals or as 64 kB/s uncoded signals depending upon which embodiment of the present invention is implemented. The 16 kB/s coded messages are decoded in converter 70 to 64 kB/s uncoded signals. For both 16 kB/s or 64 kB/s messages, control signals are converted to ISDN format and the call is transferred to the relevant terminal device 56, 57. For example, MSC 28 sends a Setup Request to converter 70. This request is also part of the RIL3-CC protocol of GSM. This request is received by converter 70 and transformed into a Setup message in the Q931 protocol of a standard ISDN telecommunications system and sent to one of the ISDN terminal devices 56, 57. The relevant device 56, 57 responds with a Call Proceeding message. The converter 70 transforms this message into the Call Confirmed message of the GSM RIL3-CC protocol. Converter 70 operates in this case as a protocol interworking device. The call setup is now complete and the call may continue.

Figure 6:
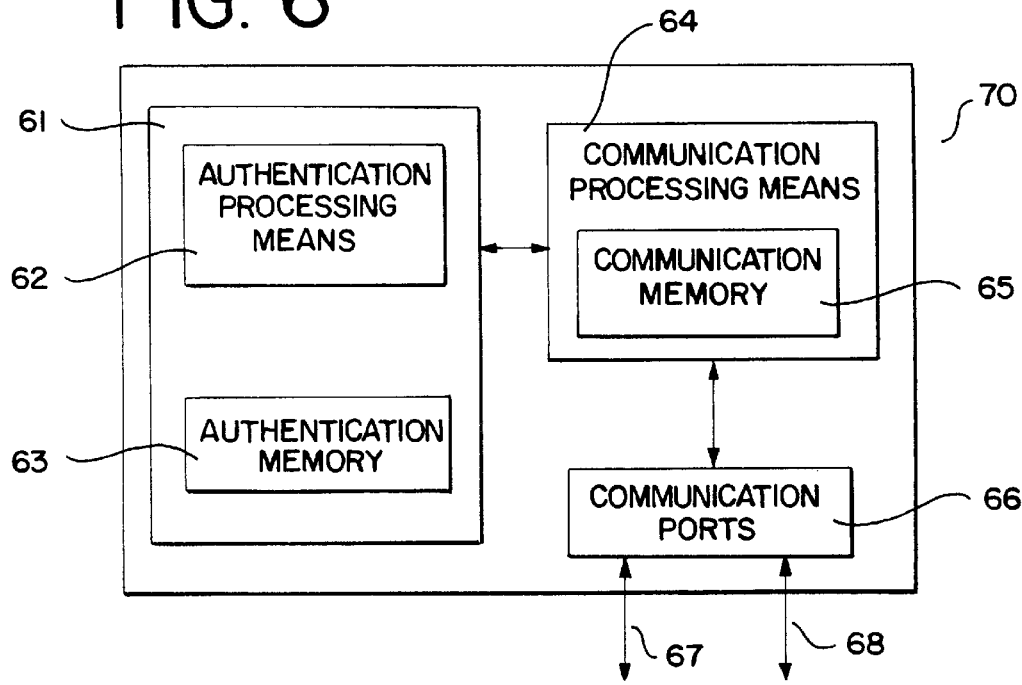
FIG. 6 is a schematic representation of a converter in accordance with the second embodiment of the present invention.

FIG. 6 is a schematic representation of a converter 70 in accordance with a further embodiment of the present invention capable of carrying out the message sequence of FIG. 5. Converter 70 may include two communication lines 67, 68 for communication between ports 66 of converter 70 and the terminal device 56 and the ABS 40 of network 20, respectively. Converter 70 may also include a communication processing means 64 in the form of a conventional programmable microprocessor or microcontroller for processing data from, and preparing data for transmission to the terminal device 56 or to the ABS 40. The processing means 64 may include a TRAU 42 depending upon which embodiment of the present invention is implemented. Processing means 64 preferably includes some memory 65 for storing of programs, data, etc. Processing means 64 may also provide the protocol conversion and rate adaption between the ISDN system on one side and the wireless network 20 on the other. Converter 70 also preferably includes a Secure Access Module 61 or SAM. This SAM 61 stores personal confidential data such as the IMSI and the key Ki in an authentication memory 63 as well as the authentication algorithms, e.g. A3. The SAM 61 also preferably includes a secure processor 62 for calculating SRES (and if required, the dormant key Kc) from the random number RAND. SAM 61 may be implemented as an Integrated Circuit Card, i.e. it may be a SIM-ICC with an appropriate reader as is known from GSM mobile stations. The communication processor 64 combined with the SAM 61 provides the responder in accordance with the present invention.

One advantage of the system in accordance with the above embodiments is that standard terminal devices 56–60 may be used, e.g. ISDN telephones. Another advantage of the system is that the control signals and other aspects of the wireless network 20 such as voice coding must be taken right up to the customers premises. This allows flexibility. One disadvantage may be that value added services may be provided in wireless network 20 which may need to be emulated in the converter 70, e.g. speed dial numbers or customized short messages services (SMS). This requires each converter 70 to include a processor to carry out the complex coding/decoding routines and rate adaption and to provide the value added services. This can make each converter 70 more expensive.

Figure 7:
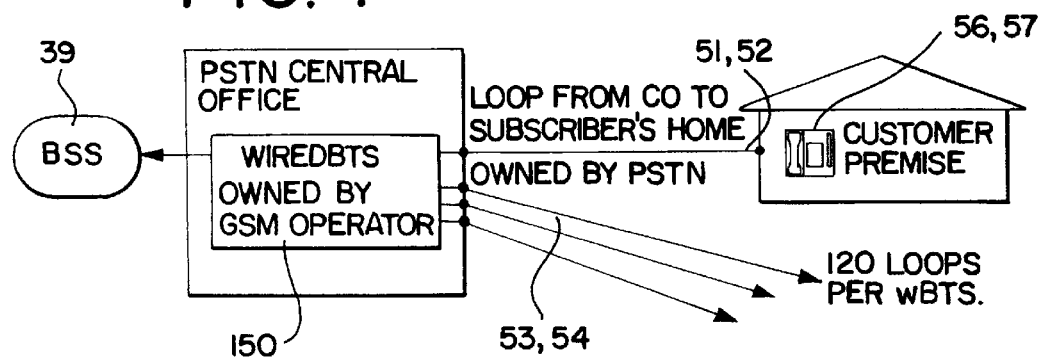
FIG. 7 is a schematic representation of a third embodiment of the present invention.

As shown schematically in FIG. 7, as the number of individual subscribers to the wireless network 20 who use the secondary network 30 increases, the number of connections to the ABS 40, e.g. as exemplified by a WBTS 150, may increase, for instance 120 or more subscribers per WBTS 150. The WBTS 150 may be physically located within the central office of the local telephone utility although it may belong to the operator of the wireless network 20. In accordance with a third embodiment of the present invention, the access node 48 is provided by a single node of the network 20, e.g. by ABS 40. One example of the access node 48 of the third embodiment will be described with reference to a WBTS 150. In accordance with the third embodiment, the processing power and the SISM's of the converters 70 described in the second embodiment may be concentrated in the ABS 40, e.g. in WBTS 150.

Figure 8:
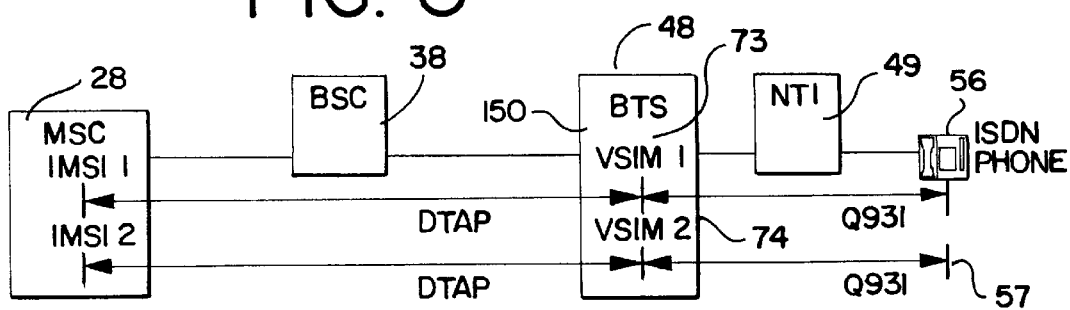
FIG. 8 is a detailed schematic representation of the third embodiment of the present invention.

As shown schematically in FIG. 8, two SISM's 73, 74 for two terminal devices 56, 57 are located in access node 48 in accordance with the third embodiment. Access node 48 may be a wired BTS (WBTS 150). Reference numerals in FIG. 8 which are the same as reference numbers in FIGS. 1 to 7 refer to the same components. It is understood that the MSC 28 shown in FIG. 7 interfaces with the wireless and wireline networks 20, 30 as shown in FIG. 1. Further, although the third embodiment will be described with reference to a wired BTS 150, the invention is not limited thereto. Referring to FIG. 1, the WBTS 150 in accordance with the third embodiment may be the ABS 40 communicating with terminal devices 45–47 via a secondary network 30 which may be any transmission network of which a wireline network is only one example.

In accordance with the third embodiment, messages from MSC 28 are transmitted to the WBTS 150 via the BSC 38. The WBTS 150 includes a plurality of SISM's 73, 74, e.g. if there are 120 subscriber loops connected to the WBTS 150, there would be 240 SISM's 73, 74. All control signals from the wireless network 20 are terminated in the WBTS 150 and any necessary vodecoding and rate adaption are performed in the WBTS 150 before transmitting the signal to the terminal devices 56, 57 in the customer premises in the standard format for the secondary network 30, e.g. ISDN. Further, a processor in WBTS 150 is adapted to carry out the value added services and to provide the necessary storage space for the SMS (short message service). At the customers premises, the wire lines 51, 52 may be terminated by an ISDN NT1 device 49 as is customary for ISDN. No decoding or rate adaption or value added service processing is performed at the customer premises. Instead, ports of the WBTS 150 provide the geographically fixed access point for the wireless network 20. WBTS 150 may be located in the wireless network 20. All signals which leave the WBTS 150 towards the terminal devices are in the format of the secondary network 30. All signals which leave the WBTS 150 towards the MSC 28 are in the format of the wireless network 20. Accordingly, control signals such as DTAP for the wireless network 20 towards the MSC 28 are generated in WBTS 150, and all DTAP signals received from the MSC 28 are terminated at the WBTS 150. Similarly, all control signals required for the ISDN telephones 56, 57, e.g. Q931 signaling, received from the NT 1 49 are terminated at the WBTS 150 and all signals going towards the NT1 49 are generated at the WBTS 150.

The SISM's 73, 74 may be in the form of SIM-ICC's inserted into a suitable receiving and reading devices (not shown). However, the location of so many physical cards within the WBTS 150 takes up a lot of space. Further, there is a significant possibility that one or more SIM-ICC's may not be placed into the correct slot leading to difficulties in billing, maintenance and problem tracking. In accordance with the present invention it is preferred if the subscriber identity information is stored in the access node 48 in a more convenient form, e.g. as an insertable programmable read only memory (PROM) block or as software representations of SII's, i.e. a virtual SIM or VSIM, in which the SIM is stored on access node 4 in conventional non-volatile memory.

For a mobile station (MS), the GSM specifications specify a SIM-MS interface that allows value-added service information to be stored within the SIM. Examples are speed dial numbers or customized Short Message Service (SMS) text strings. With a VSIM there is no physical SIM to store any extra service information. Thus the access node 48 stores such information in non-volatile memory capable of surviving shut down and re-boot. Further, the software running on the processor of access node 48 may handle the virtual MS-SIM interface and support the conventional SIM/MS services behavior.

An embodiment of the access node 48 suitable for use in the third embodiment of the present invention will be described with reference to FIG. 9. Access node 48 includes communication connections 101, 102 for transmitting signaling and user messages, respectively, to and from the wireless network 20 via ports of switching means 93. These connections are normally made with an MSC 28 as described above. The signaling and message connections 101, 102 may be, for example, different channels of a TDMA communications system between the MSC 28 and the access node 48. The communications connections 101, 102 may be any suitable form of connection, e.g. a wireline or wirelines or a microwave link. Access node 48 also includes signaling and user message communications connections 103, 104, respectively, for transmission to and from the secondary network 30, e.g. to the customer premises and to terminal devices such as ISDN telephones 56, 57, via the ports of switching means 93. Communications connections 103, 104 may be any suitable connections, e.g. for a WBTS 150 the connections 103, 104 are represented by a wireline 51, 52 connected to the respective port of switching means 93, however, the invention is not limited to a wired BTS 150.

Figure 9:
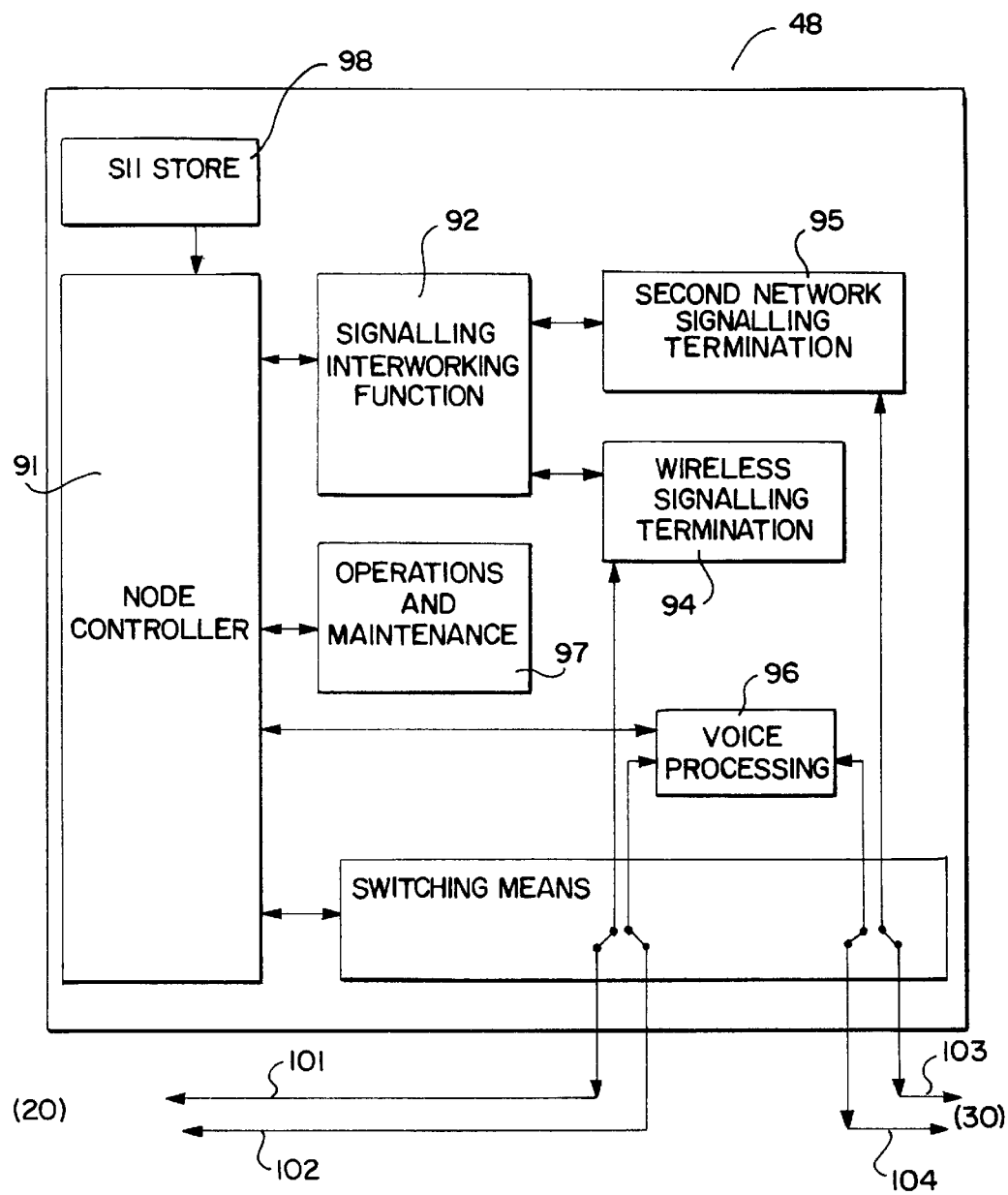
FIG. 9 is a schematic functional block diagram of an access node in accordance with the third embodiment of the present invention.

The blocks in FIG. 9 represent certain functions of the access node 48. They do not necessarily represent individual hardware elements of the node 48. The functions to be described with respect to node 48 may be implemented in a variety of ways, e.g. by conventional processors running associated software specifically adapted to perform the functions in accordance with the present invention and memory devices, e.g. disc drives, as well as other communications peripheral equipment, e.g. suitable ports and digital switches. The node 48 may be controlled by a node controller 91 which may be a processor which carries out common functions necessary to control the node 48. The node controller 93 controls and co-ordinates the functions of the voice processor 96, the operations and maintenance unit 97, the signaling interworking unit 92 as well as the switching means 93. The operations and maintenance unit 97 will not be described in detail. The voice processor 96 may include a transcoder and rate adapter to code and decode between the compressed voice data from the wireless network 20 and the uncompressed voice data transmitted to and from the end terminals 56, 57. The signaling interworking unit 92 terminates the signaling messages (represented by block 94) in the format of the wireless network 20 as well as terminating the signaling messages (represented by block 95) in the format of the secondary network 30. Signal interworking unit 92 converts signal formats between the wireless network 20 and the secondary network 30. Switching means 93 provides connections to and from the ports of the access node 48 as well as routing signals to the appropriate processors within access node 48.

Access node 48 also includes a store 98 for the subscriber identity information (SII), e.g. for storing the SII 73, 74 of WBTS 150. This store may be in the form of an addressable read only non-volatile memory, e.g. a detachable block of programmable read-only memory, which has been pre-programmed with the subscriber identity information such as the IMSI and the private key $K_i$. The encryption algorithms may be stored in the same store 98 and may be executed by the node controller 91 or by a separate dedicated authentication processor (not shown). The SII store 98 may also be conventional addressable non-volatile memory storage, i.e. e.g. a hard disc and the SII store is then described in accordance with the present invention as a Virtual Subscriber Identity Module or VSIM. Alternatively, and less preferably, the store 98 may be a plurality of SIM-ICC's, each slotted into a respective card reader (not shown).

When a message including signaling and a user message in the format of the wireless network 20, e.g. GSM, is received by a switching means 93 via the communications lines 101, 102, the signaling and user message (voice message) are each directed to the relevant processing means 92, 94, 95; 96. Signals from the wireless network 20 are terminated at 94 and the signals converted into the format of the secondary network in the signaling interworking unit 92 as well as any rate adaption necessary between the wireless network 20 and the secondary communications network 30. User messages in the form of voice or data information are directed to the voice processor 96 which carries out any rate adaption and transcoding required and prepares the messages for transmission in the secondary network 30. The converted signaling information as well as the voice and/or data messages from the voice processing unit 96 is then transmitted to the secondary network 30 via the unit 95, the switching means 93 and its ports and the relevant communications connections 103, 104.

Figure 10:
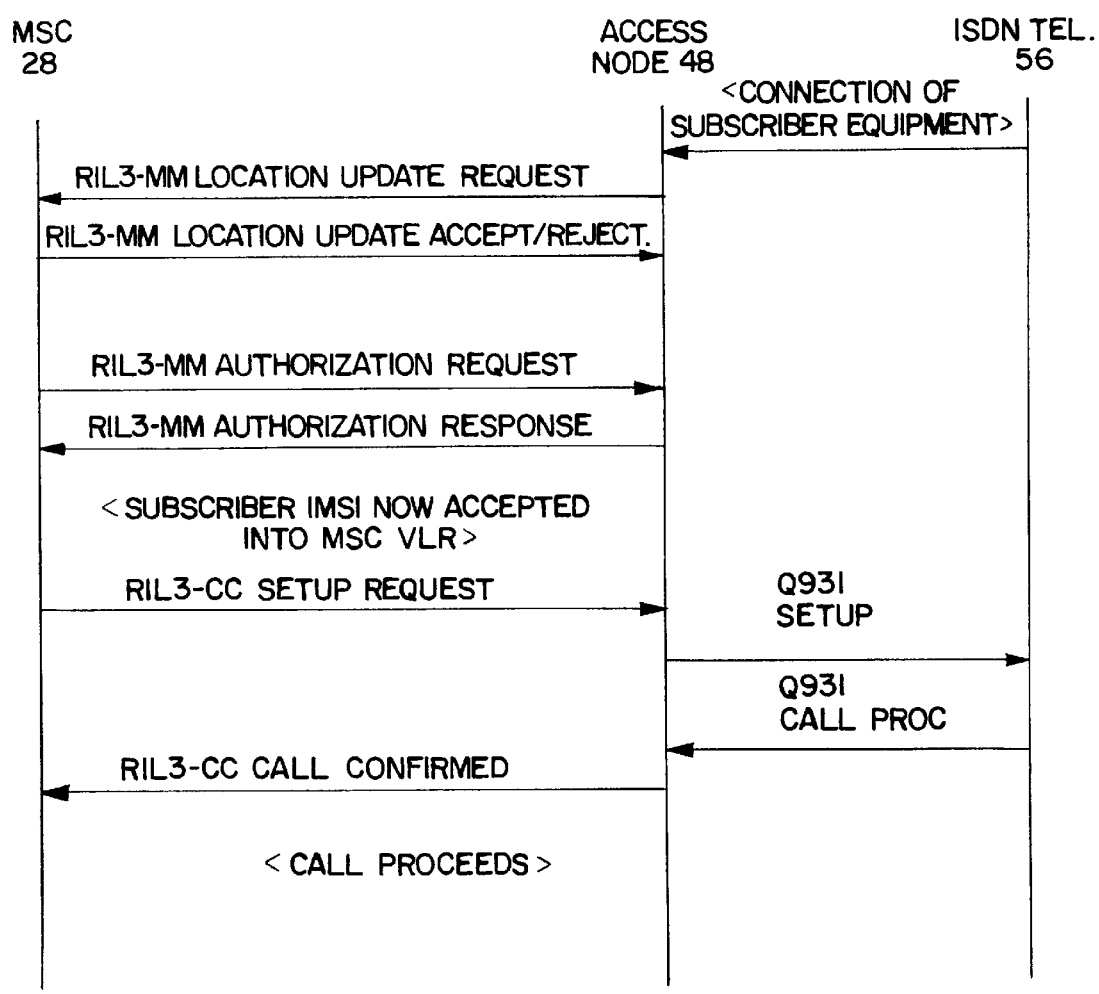
FIG. 10 shows a message sequence in accordance with the third embodiment of the present invention.

A possible message sequence for the third embodiment is shown schematically in FIG. 10. In order to register with wireless network 20, the access node 48, e.g. a WBTS 150, generates a LUR using the subscriber identity information from the relevant SII 73, 74 in store 98 and sends the LUR to the MSC 28 under the control of the node controller 91 and the switching means 93. The MSC 28 may respond immediately to the access node 48 or may interrogate the HLR 26. From the LUR, the MSC 38 can derive the system address of the HLR 26 (e.g. from look-up tables) and can relay the request thereto. The answer provided may be either a Location Updating Reject message or, more likely, a Location Update Accept message. It should be noted that location updating may still be required even though there is only one possible "location" for the SII's 73 and 74, as it may be necessary to restore the databases in the VLR (visiting location register) or the MSC 28 after failures.

Before or after sending an LUR accept message, MSC 28 may request authentication from the access node 48. It is preferred if authentication is of the active type with an exchange between the access node 48 and the MSC 28 of a random number and of the transform of this number by an encryption function using a secret key personal to the subscriber. To do this the MSC sends an Authorization Request containing the randomly generated number RAND which is to be processed by the access node 48. The access node 48 generates a response, the SRES, from the RAND preferably using an algorithm such as A3 which is a one-way or trap-door function. To do this, the node controller 91 of the access node 40 retrieves the private key Ki stored as part of the relevant SII 73, 74 from SII store 98. The node controller 91 calculates the SRES using the relevant algorithm and responds to the MSC 28. The node controller 91 in combination with the store 98 represents a responder in accordance with the present invention. The MSC 28 compares the SRES from the access node 48 and the SRES generated by the wireless network 20 (e.g. in the AuC) from the same RAND and same Ki for the subscriber involved. If both agree, the SII's 73, 74 of access node 48 are now registered in wireless network 20 as if they belonged to a mobile station.

For each subscriber information in SII's 73, 74 in the access node 48, the routing information to the respective MSC 28 is stored in the HLR 26. Any call to one of the terminal devices 56, 57 is routed by the HLR 26 to the MSC 28, and via the BSC 38 to the access node 48. The access node 48 receives the call either as 16 kB/s coded signals or as 64 kB/s uncoded signals depending upon which embodiment of the present invention is implemented. The 16 kB/s coded messages are decoded in access node 40 to 64 kB/s uncoded signals. For both 16 kB/s or 64 kB/s messages, control signals are converted to ISDN format and the call is transferred to the relevant terminal device 56, 57. For example, MSC 28 sends a Setup Request to access node 48. This request is also part of the RIL3-CC protocol of GSM. This request is received by access node 48 and transformed into a Setup message in the Q931 protocol of a standard ISDN telecommunications system and sent to one of the ISDN terminal devices 56, 57. The relevant device 56, 57 responds with a Call Proceeding message. The access node 48 transforms this message into the Call Confirmed message of the GSM RIL3-CC protocol. The call setup is now complete and the call may continue. The access node 48 operates in this embodiment as a protocol interworking device.

Figure 11:
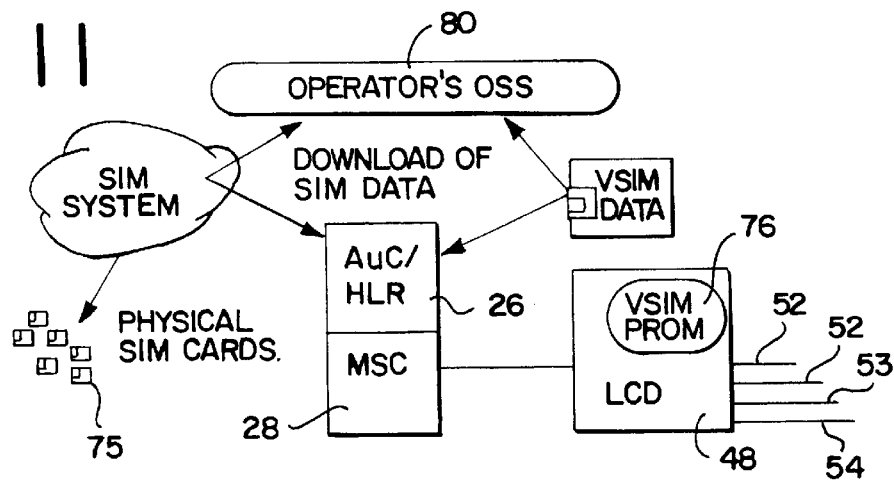
FIG. 11 is a schematic representation of ways of authenticating subscribers in accordance with the present invention.

A method of initial authentication of mobile station SIM-ICC's 75, SIM's 73, 74 and virtual SIM's 76 is shown schematically in FIG. 11. For SIM cards 75 which are to be inserted into conventional mobile stations, the SIM card 75 is usually purchased from an independent SIM card supplier who provides not only a completed SIM card 75 but also a data file containing the same information. The data file is read into the Authentication Center (AuC) of the HLR 26 for service provisioning and into the wireless network provider's operation sub-system OSS 80 for billing and tracking. SIM's 73, 74 and VSIM's 76 are created in a similar way. The SIM or VSIM provider generates a data file of SIM or VSIM information that is read into the AuC of HLR 26 and into the mobile network operator's OSS 80. SIM PROM's 76 are created from the data file and installed in the access node 48. Alternatively, the software in access node 48 is updated to provide the VSIM's. The access node 48 assigns two SIM's/VSIM's to each line 51–55. For each SIM/VSIM 73, 74, 76 an IMSI and the GSM secret key, the Ki, is generated.

Figure 12:
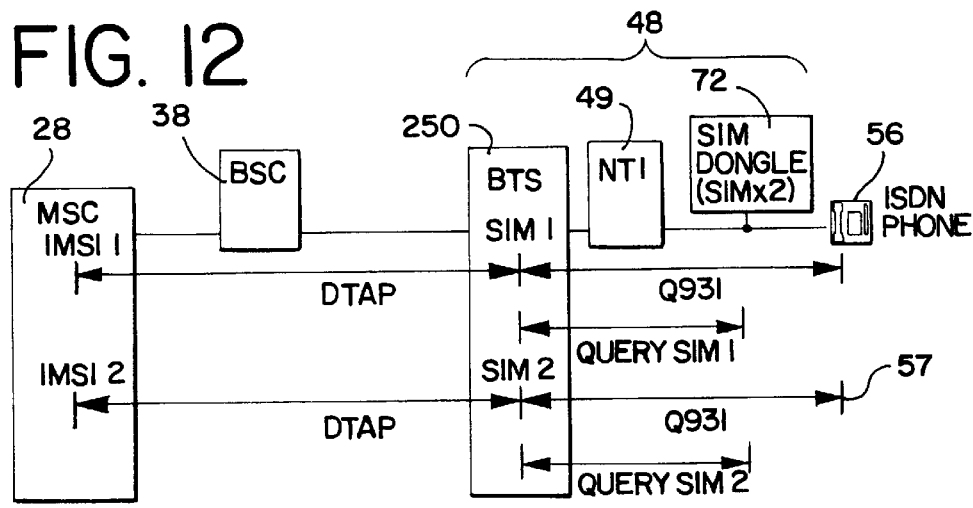
FIG. 12 is a schematic representation of a fourth embodiment of the present invention.

A schematic representation of a fourth embodiment of the present invention is shown in FIG. 12. In this embodiment the access node means 48 in accordance with the present invention is represented by responder 77, whereby some functions are carried out by the WBTS 250. The functions of the access node 48 in accordance with the present invention are therefore shared between WBTS 250 and the responder 77. With reference to FIG. 1, the ABS 40 is represented by the wired BTS 250 in accordance with this embodiment. WBTS 250 is similar to the WBTS 150 of the third embodiment and is responsible for converting all messages to and from the format of the secondary network 30, e.g. ISDN. WBTS 250 has the same communication processing capability as the WBTS 150 of the third embodiment. However, WBTS 250 does not include a store for the SII. WBTS 250 of the fourth embodiment does not contain the SII's 73, 74 of the WBTS 150 of the third embodiment, instead the subscriber identity information SII 73, 74 is stored in a responder 77. The term "responder" in this application refers to an electronic device which provides a specific response to a query, e.g. returns SRES when interrogated with a RAND. The responder 77 therefore bears some superficial similarity to so-called "dongles" which are hardware devices for copy protection of software. It will be understood that the use of the word "responder" in the present application relates only to the specific devices disclosed in this application and does not relate to commercially available copy protection devices. Responder 77 may include two SIM-ICC's with associated readers and may be located on the ISDN S/T bus in the subscriber premises. Vocoding and DTAP termination are in the WBTS 250 as for the third embodiment. The responder 77 does not provide protocol interworking, this is carried out in the WBTS 250. The WBTS 250 is able to access either SII 73, 74 in the responder 77 for authentication requests.

Figure 13:
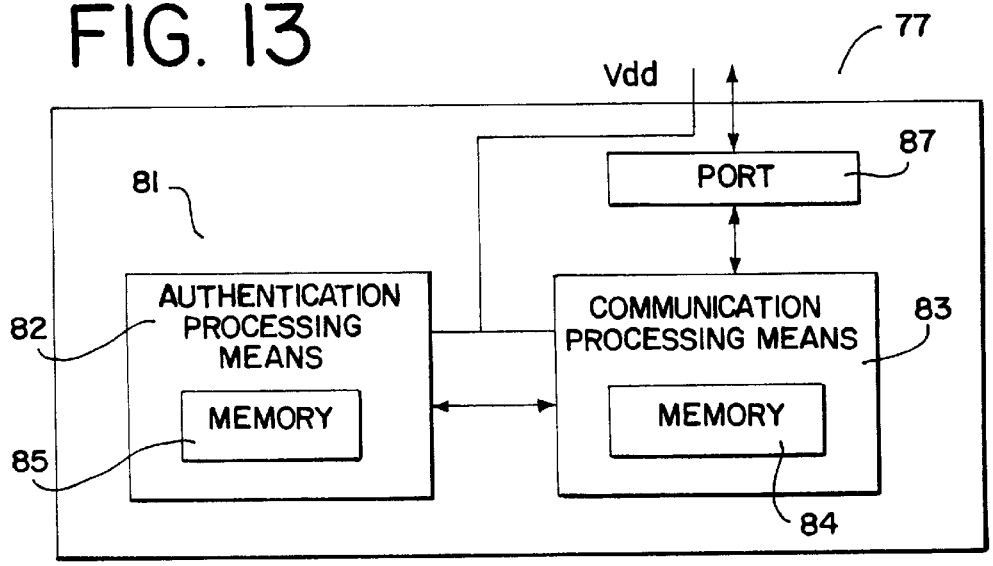
FIG. 13 is a schematic representation of a SII responder in accordance with the fourth embodiment of the present invention.

One implementation of the responder 77 in accordance with the present invention is shown schematically in FIG. 13. The responder 77 may be a small (8×4×2 cm) unit that connects to the S/T bus of an NT1 49 via a port 87. The responder 77 takes-up one of the 8 allowed terminals on the S/T bus. Responder 77 stores two subscriber identity informations SII 73, 74 in a secure access Subscriber Information storing Means (SISM) 81 which includes a suitably secure non-volatile memory 85. SISM 81 includes an authentication processor 82 for generating the SRES from the RAND. Responder 77 includes a communication processor 83 for carrying out the ISDN layer 1&2 logic to connect to the S/T bus. Responder 77 preferably has a memory 84 dedicated to the communication processor 83. A suitable voltage Vdd is provided by the S/T bus for driving the memories 84, 85 and the processors 82, 83. The responder 77 responds only to a single fixed Terminal Equipment Identifier (TEI) on the ISDN D-channel. The responder 77 is transparent to messages on ISDN B-Channels. Other terminals on the bus are unaffected by D-channel messaging to and from responder 77 since they ignore messages not sent to their own TEI. Responder 77 may be implemented as an application specific integrated circuit, e.g. a single chip processor, and does not need to be programmable.

The WBTS 250 converts any message from MSC 28 into the format expected by the authentication processor 82 of the responder 77. These messages are sent to the responder 77 via the ISDN D-Channel. The communication processor 83 of responder 77 removes any data in the message relating to the ISDN format and presents the message (e.g. RAND) to the authentication processor 82. Any response from the authentication processor 82 is then converted into ISDN D-channel format by communication processor 83 and returned to the WBTS 250. As described above, ISDN layer 3 messaging is between the MSC 28 and the SISM 81, with the processor 83 of responder 77 providing only layer 1 and 2. Preferably, the WBTS 250 and the responder 77 can respond to the following types of queries:

a. IMSI Queries.
 b. Verification and authentication requests
 c. SIM System value-added services.

Figure 14:
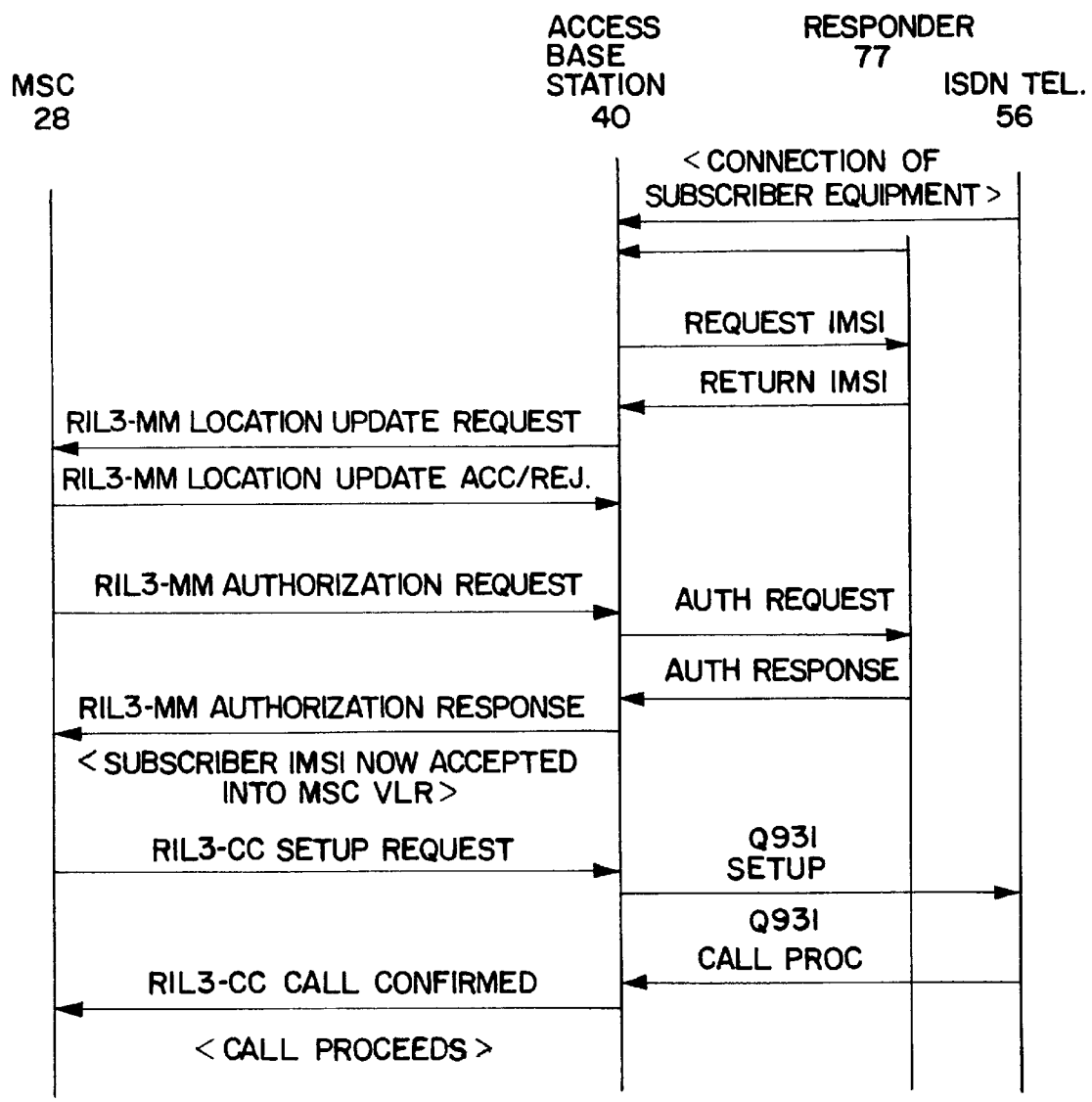
FIG. 14 shows a message sequence in accordance with the fourth embodiment of the present invention.

A possible message sequence in accordance with the fourth embodiment is shown schematically in FIG. 14. In order to register with wireless network 20, the WBTS 250 interrogates the responder 77 requesting the responder 77 to provide the IMSI of the subscriber using the ISDN D-channel. The communications processor 83 of the responder 77 transmits the request to the authentication processor 82 which retrieves the IMSI from the memory 85. The IMSI is sent in clear to the WBTS 250. WBTS 250 generates a LUR using the IMSI obtained from the responder 77 and sends the LUR to the MSC 28. The MSC 28 may respond immediately to the WBTS 250 or may interrogate the HLR 26. From the LUR, the MSC 28 can derive the system address of the HLR 26 (e.g. from look-up tables) and can relay the request thereto. The answer provided may be either a Location Updating Reject message or, more likely, a Location Update Accept message.

Before or after sending an LUR accept message, MSC 28 may request authentication from the WBTS 250. It is preferred if authentication is of the active type with an exchange between the WBTS 250 and the MSC 28 of a random number and of the transform of this number by an encryption function using a secret key personal to the subscriber. To do this the MSC 28 sends an Authorization Request via the WBTS 250 containing the randomly generated number RAND which is to be processed by the responder 77. The WBTS 50 transmits the request on the ISDN D-channel to the responder 77. The communications processor 83 in responder 77 relays the RAND to the authentication processor 82 after removing any data relevant only to D-channel signaling. The authentication processor 82 applies the relevant algorithm on the RAND, e.g. A3, and generates a response, the SRES, using the private key Ki stored as part of the SII 73 or 74 in memory 85. The responder 77 sends the SRES to the MSC 28 via the WBTS 250. The MSC 28 compares the SRES from the WBTS 250 and the SRES generated by the wireless network 20 (e.g. in the AuC) from the same RAND and the same Ki for the subscriber involved. If both agree, the SII 73 or 74 of responder 77 is now registered in wireless network 20 as if it belonged to a mobile station.

For each subscriber information in responder 77, the routing information to the respective MSC 28 is stored in the HLR 26. Any call to one of the terminal devices 56, 57 is routed by the HLR 26 to the MSC 28, and via the BSC 38 to the WBTS 250. The WBTS 250 receives the call either as 16 kB/s coded signals or as 64 kB/s uncoded signals depending upon which embodiment of the present invention is implemented. The 16 kB/s coded messages are decoded in WBTS 250 to 64 kB/s uncoded signals. For both 16 kB/s or 64 kB/s messages, control signals are converted to ISDN format and the call is transferred to the relevant terminal device 56, 57. For example, MSC 28 sends a Setup Request to WBTS 250. This request is also part of the RIL3-CC protocol of GSM. This request is received by WBTS 250 and transformed into a Setup message in the Q931 protocol of a standard ISDN telecommunications system and sent to one of the ISDN terminal devices 56, 57. These Q931 messages are transparent to the responder 77 as they are not addressed to the TEI of the responder 77. The relevant device 56, 57 responds with a Call Proceeding message. The WBTS 250 transforms this message into the Call Confirmed message of the GSM RIL3-CC protocol. The call setup is now complete and the call may continue. WBTS 250 operates in this embodiment as a protocol interworking device.

In the event of a failure involving the responder 77 the WBTS 250 would not be able to associate the respective terminal device 56, 57 to a subscriber's service. However it would still possible for the WBTS 250 to allow certain calls to be originated from that terminal device. Emergency calls could be recognized and routed using GSM emergency call protocols. All other originations could be routed to a service center (not shown). The service center phone number and a service IMSI to use for the call would be defined as WBTS 250 attributes at the OMCR. The GSM system specifies a SIM-MS interface that allows value-added service information to be stored within the SIM-ICC. Examples are speed dial numbers, customized Short Message Service (SMS) text strings. If value-added services are supported, the software of WBTS 250 supports these.

While the invention has been shown and described with reference to preferred embodiments, it will be understood by those skilled in the art that various changes or modifications in form and detail may be made without departing from the scope and spirit of this invention.

What I claim is:

1. A telecommunications system comprising:
a first radio telecommunications network having at least one radio coverage and a switching controller for generating control signals of a first format and for transmitting said control signals to a base station system; and
a second wireline telecommunications network including at least one subscriber terminal, said at least one subscriber terminal being connected to said base station system by said second wireline network; said system further comprising:
means for storing identifiers of a group of a plurality of subscribers to said first radio telecommunications network, each said subscriber identifier being associated with one subscriber of said group and also being associated with a fixed geographical access point of a plurality of fixed geographical access points, said storing means is adapted to provide said first radio telecommunications network with at least verification information relating to a subscriber of said group; and
access node means located between the switchin controller and the subscriber terminal, said first radio telecommunications network being adapted so that when a call is placed to a subscriber in said group, said switching controller directs the call to said access node means and said access node means terminates control signals of said first format from said switching controller and transfers said call to the subscriber terminal in said second wireline telecommunications network associated with said called subscriber via the fixed geographical access point.

2. A telecommunications system according to claim 1, wherein said subscriber terminals terminate local wire loops of said second wireline telecommunications network.

3. A telecommunications system according to claim 1 wherein said storing means is located at at least one premises of said group of subscribers.

4. A telecommunications system according to claim 3, wherein said storing means includes verification means for computing a result using an encryption algorithm and a key from an alphanumeric indication provided by first said radio telecommunications network.

5. A telecommunications system according to claim 4, wherein said access node means is located at the premises of said group of subscribers.

6. A telecommunications system according to claim 3, wherein said access node means is adapted for two-way communication with said switching controller.

7. A telecommunications system according to claim 5, wherein said access node means also includes means for decoding and coding voice messages.

8. A telecommunications system according to claim 1, wherein said access node means includes said storing means and said access node means is remote from the premises of said group of subscribers.

9. A telecommunications system according to claim 8 wherein said storing means includes a programmable read only memory for storing said subscriber identifier.

10. A telecommunications system according to claim 9, wherein said storing means includes verification means for computing a result using an encryption algorithm and a key from an alphanumeric indication provided by said first radio telecommunications network.

11. A telecommunications system according to claim 8, wherein said access node means is adapted for two-way communication with said switching controller.

12. A telecommunications system according to claim 8, wherein said access node means also includes means for decoding and coding voice messages.

13. A telecommunications system according to claim 1, wherein said storing means is adapted to provide said first radio telecommunications network with authentication information relating to a subscriber of said group.

14. An access node for use with a radio telecommunications network, comprising:
communication means for receiving signals from, and transmitting signals to the radio telecommunications network in a first format to a wireline network connectable to the access node;
means for storing identifiers of a group of a plurality of subscribers to said radio telecommunications network, each said subscriber identifier being associated with one subscriber of said group and also being associated with one of a plurality of output ports of said access node, said storing means being adapted to provide said radio telecommunications network with at least verification information relating to a subscriber of said group of subscribers; and
said access node being adapted so that when a call is placed to a subscriber in said group via said radio telecommunications network, said access node terminates control signals of said first format from said radio telecommunications network and transfers said call to the output port associated with said called subscriber.

15. An access node according to claim 14 wherein said storing means is located at the premises of said group of subscribers.

16. An access node according to claim 15, wherein said storing means includes verification means for computing a result using an encryption algorithm and a key from an alphanumeric indication provided by said radio telecommunications system.

17. An access node according to claim 15, wherein said access node is located at the premises of said group of subscribers.

18. An access node according to claim 14, wherein said access node also includes means for decoding and coding voice messages.

19. An access according to claim 14, wherein said access node means is remote from the premises of said group of subscribers.

20. An access node according to claim 14, wherein said storing means includes a programmable read only memory for storing said subscriber identifier.

21. An access node according to claim 20, wherein said storing means includes verification means for computing a result using an encryption algorithm and a key from an alphanumeric indication provided by said radio telecommunications network.

22. An access node according to claim 19, wherein said access node means also includes means for decoding and coding voice messages.

23. An access node according to claim 14, wherein said storing means is adapted to provide said first radio telecommunications network with authentication information relating to a subscriber of said group.

24. A responder suitable for connection in a network-wise geographically fixed position in a first wireline telecommunications network between a subscriber terminal and a second radio telecommunications network, comprising:
means for storing at least one subscriber identity information of a subscriber to said second radio telecommunications network and a key;

verification means for generating a result of an encryption algorithm with the aid of said key; and means for transmitting said result towards said second radio telecommunications network via said first wireline telecommunications network.

25. A responder according to claim 24, further comprising communication processing means for receiving an alphanumeric message and control data from said second radio telecommunications network via said first telecommunications network and for transmitting only said alphanumeric message to said verification information means.

26. A method of operating a telecommunications system including a first radio telecommunications network having at least one radio coverage area, a switching controller and a base station system in communication with said switching controller, and a second wireline telecommunications network including a subscriber terminal, said subscriber terminal being connected to said base station system by said second wireline telecommunications network, said method comprising the steps of:

storing identifiers of a group of a plurality of subscribers to said first radio telecommunications network, each said subscriber identifier being associated with one subscriber of said group and also being associated with a fixed geographical access point of a plurality of fixed geographical access points;

providing said first radio telecommunications system with at least verification information relating to a subscriber of said group based on said stored subscriber identifier information when a request therefor is sent from said first radio telecommunications system; and when a call is placed to a subscriber in said group:

said first radio telecommunications network generates control signals of a first format and transmits said control signals and said call to an access node means located between said switching controller and said subscriber terminal; and said access node means terminates said control signals of said first format and transfers said call towards said subscriber terminal in said second wireline telecommunications network via the fixed geographical access point associated with said called subscriber.

27. A method according to claim 26, wherein the providing step includes computing a result using an encryption algorithm and a key from an alphanumeric indication provided by said first radio telecommunications network, and transmitting said result to the first radio telecommunications network.

28. A method according to claim 27, wherein said providing step includes sending said alphanumeric indication to a responder at the premises of said subscriber, computing said result in said responder and transmitting said result to the access node means.

29. A method according to claim 26, further comprising the step of decoding and coding voice messages in said access node means.

30. A method according to claim 26, further comprising providing said first radio telecommunications network with authentication information relating to a subscriber of said group.

31. A method of operating an access node for use with a radio telecommunications network, comprising:

storing identifiers of a group of a plurality of subscribers to said radio telecommunications network, each said subscriber identifier being associated with one subscriber of said group and also being associated with one of a plurality of output ports of said access node;

providing said radio telecommunications network with at least verification information relating to a subscriber of said group of subscribers on request; and when a call is placed to a subscriber in said group:

receiving control signals of a first format and said call from said radio telecommunications network via a wireline network connection to the access node, and terminating said control signals of said first format and transferring said call to the output port associated with said called subscriber.

32. A method according to claim 31, wherein the providing step includes computing a result using an encryption algorithm and a key from an alphanumeric indication provided by said radio telecommunications network, and transmitting said result to the radio telecommunications network.

33. A method according to claim 31, wherein said providing step includes sending said alphanumeric indication to a responder at the premises of said subscriber, computing said result in said responder and transmitting said result to the access node.

34. A method according to claim 31, further comprising the step of decoding and coding voice messages in said access node.

35. A method according to claim 31, further comprising the step of providing said first radio telecommunications network with authentication information relating to a subscriber of said group.

36. A method of operating a responder connected in a network-wise geographically fixed position in a first wireline telecommunications network between a subscriber terminal and a second radio telecommunications network, comprising:

storing in said responder at least one subscriber identity information of a subscriber to said second radio telecommunications network and a key;

generating a result of an encryption algorithm with the aid of said key; and transmitting said result towards said second radio telecommunication network via said first wireline telecommunications network.

37. A method of operating a responder according to claim 36, wherein said generating step includes receiving an alphanumeric message and control data from said second radio telecommunications network and for transmitting only said alphanumeric message to said verification means.

38. A telecommunications system comprising:

a first radio telecommunications network having at least one radio coverage area and a switching controller, said switching controller generating control signals and transmitting said control signals to a base station system; and a second wireline telecommunications network including at least one subscriber terminal, said at least one subscriber terminal being connected to said base station system by said second wireline telecommunications network;

said telecommunications system further comprising:

means for storing identifiers of a group of a plurality of subscribers to said first radio telecommunications network, each said second subscriber identifier being associated with one subscriber of said group, said storing means being associated with at least a responder in a network-wise geographically fixed position for providing said first radio telecommunications network with at least verification information relating to a subscriber of said group;

said first radio telecommunications network being adapted so that when a call is placed to a subscriber in said group, said switching controller directs the call towards the location of said storing means, in response thereto said responder provides verification information of said called subscriber to said radio telecommunications network and said call is transferred to the subscriber terminal in said second wireline telecommunications network.

39. A telecommunications system according to claim 38, wherein said subscriber terminals terminate local wire loops of said second wireline telecommunications network.

40. A telecommunications system according to claim 38 wherein said storing means and said responder are located at least one premises of said group of subscribers.

41. A telecommunications system according to claim 40, wherein said responder includes verification means for computing a result using an encryption algorithm and a key from an alphanumeric indication provided by first said radio telecommunications network.

42. A telecommunications system according to claim 38, wherein said responder is located at the premises of said group of subscribers.

43. A telecommunications system according to claim 38, wherein said responder is adapted for two-way communication with said switching controller.

44. A telecommunications system according to claim 38, wherein said storing means are remote from the premises of said group of subscribers.

45. A telecommunications system according to claim 38, wherein said storing means includes a programmable read only memory for storing said subscriber identifier.

46. A telecommunications system according to claim 38, wherein said responder includes verification means for computing a result using an encryption algorithm and a key from an alphanumeric indication provided by said first radio telecommunications network.

47. A telecommunications system according to claim 46, wherein said responder is adapted for two-way communication with said switching controller.

48. A telecommunications system according to claim 38, wherein said responder is adapted to provide said first radio telecommunications network with authentication information relating to a subscriber of said group.

49. An access node for use with a radio telecommunications network, comprising:
   communication means for receiving signals from, and transmitting signals to the radio telecommunications network via a wireline network connection to said access node;
   means for storing identifiers of a group of a plurality of subscribers to said radio telecommunications network, each said subscriber identifier being associated with one subscriber of said group and also being associated with one of a plurality of output ports of said access node,
   a responder adapted to provide said radio telecommunications network with at least verification information relating to a subscriber of said group of subscribers; and
   said access node being adapted so that when a call is placed to a subscriber in said group via said radio telecommunications network, said access node transfers said call to the output port associated with said called subscriber.

50. An access node according to claim 49 wherein said storing means is located at the premises of said group of subscribers.

51. An access node according to claim 49, wherein said responder includes verification means for computing a result using an encryption algorithm and a key from an alphanumeric indication provided by said radio telecommunications system.

52. An access node according to claim 49, wherein said access node is located at the premises of said group of subscribers.

53. An access node according to claim 49, wherein said access node also includes means for decoding and coding voice messages.

54. An access according to claim 49, wherein said access node means is remote from the premises of said group of subscribers.

55. An access node according to claim 49, wherein said storing means includes a programmable read only memory for storing said subscribers identifier.

56. An access node according to claim 54, wherein said responder includes verification means for computing a result using an encryption algorithm and a key from an alphanumeric indication provided by said radio telecommunications network.

57. An access node according to claim 54, wherein said access node means also includes means for decoding and coding voice messages.

58. An access node according to claim 49, wherein said responder is adapted to provide said first radio telecommunications network with authentication information relating to a subscriber of said group.

59. A method of operating a telecommunications system including a first radio telecommunications network having at least one radio coverage area, a switching controller and a base station system communicating with said switching controller; and a second wireline telecommunications network including a subscriber terminals, said subscriber terminal being connected to said base station system by said second wireline telecommunications network, said method comprising the steps of:
   storing identifiers of a group of a plurality of subscribers to said first radio telecommunications network, each said subscriber identifier being associated with one subscriber of said group;
   and when a call is placed to a subscriber in said group:
      said first radio telecommunications network transmits said call towards said storing means; in response thereto, transmitting to said first radio telecommunications system from a responder in a network-wise geographically fixed position at least verification information relating to the called subscriber based on said stored subscriber identifier information; and
      transferring said call to said subscriber terminal in said second wireline telecommunications network.

60. A method according to claim 59, wherein the step of transmitting verification information includes computing a result using an encryption algorithm and a key from an alphanumeric indication provided by said first radio telecommunications network, and transmitting said result to the first radio telecommunications network.

61. A method according to claim 59, further comprising the step of decoding and coding voice messages.

62. A method according to claim 59, further comprising providing said first radio telecommunications network with authentication information relating to a subscriber of said group.

63. A method of operating an access node for use with a radio telecommunications network, comprising:
   storing identifiers of a group of a plurality of subscribers to said radio telecommunications network, each said subscriber identifier being associated with one subscriber of said group and also being associated with one of a plurality of output ports of said access node; and when a call is placed to a subscriber in said group:
- receiving the call at said access node via a wireline network connection to said access node; providing said radio telecommunications network with at least verification information relating to a subscriber of said group of subscribers from a responder in a network-wise geographically fixed position; and
- transferring said call to the output port associated with said called subscriber.

64. A method according to claim 63, wherein the providing step includes computing a result using, an encryption algorithm and a key from an alphanumeric indication provided by said radio telecommunications network, and transmitting said result to the radio telecommunications network.

65. A method according to claim 63, further comprising the step of decoding and coding voice messages.

66. A method according to claim 63, further comprising the step of providing said first radio telecommunications network with authentication information of a subscriber.

* * * * *